United States Patent [19]

Mizukami et al.

[11] 4,373,168

[45] Feb. 8, 1983

[54] DIGITAL TIME-BASE CORRECTOR HAVING A WIDE CORRECTION RANGE

[75] Inventors: Mineo Mizukami; Tatsuo Konishi, both of Tokyo, Japan

[73] Assignee: Nippon Electric Co., Ltd., Tokyo, Japan

[21] Appl. No.: 135,084

[22] Filed: Mar. 28, 1980

[30] Foreign Application Priority Data

Mar. 30, 1979 [JP] Japan .................................. 54-39133
Mar. 30, 1979 [JP] Japan .................................. 54-39135
Mar. 30, 1979 [JP] Japan .................................. 54-39136

[51] Int. Cl.³ .......................... H04N 9/46; H04N 5/76
[52] U.S. Cl. ..................................... 358/19; 358/326; 358/339
[58] Field of Search .................... 358/8, 127, 19, 35; 360/10, 36, 37

[56] References Cited

U.S. PATENT DOCUMENTS 4,216,504  8/1980  Boussina et al. ..................... 358/8

Primary Examiner—James W. Moffitt
Assistant Examiner—Donald McElheny, Jr.
Attorney, Agent, or Firm—Hopgood, Calimafde, Kalil, Blaustein & Judlowe

[57] ABSTRACT

Disclosed is a digital time-base corrector (TBC) capable of correcting not only time-base fluctuation (jitter) but also a time-base change contained in a VTR-reproduced television video signal which experiences large changes in the horizontal scanning period during, for example, special-motion reproduction. The leading edge of a horizontal sync pulse is delayed by a variable delay means, and gate pulse is produced from the delayed leading edge and non-delayed trailing edge of the sync pulse. The delay time is controlled in response to the pulse width of the gate pulse. A burst gate pulse is produced from the trailing edge of the gate pulse. The burst gate pulse gates the video signal to extract a color burst, which is used to produce a clock pulse. The video signal is converted into a digital signal and stored in a digital memory in response to the clock pulse.

9 Claims, 13 Drawing Figures

DIGITAL TIME-BASE CORRECTOR HAVING A WIDE CORRECTION RANGE

FIELD OF THE INVENTION

This invention relates to a digital time-base corrector (TBC) for correcting a time-base error contained in a television video signal reproduced from a television video signal recorder/reproducer, and more particularly to a digital TBC capable of correcting not only time-base fluctuation (jitter) but also a time-base change contained in a reproduced television video signal which experiences large changes in the horizontal scanning period.

BACKGROUND OF THE INVENTION

Several systems have been proposed to record and/or reproduce television video signals on a magnetic tape. One such system is the helical-scan video tape recorder (VTR) wherein a tape wrapped around a drum, which includes a rotary head, is transported to form video tracks or recorded paths of a video signal on the tape diagonally with respect to the longitudinal direction of the tape. Such a helical-scan VTR is widely used by consumers as well as in industry and by professionals in broadcasting stations. In the helical VTR, the video signal of one or more fields is usually recorded on a single video track, and the rotary head is rotated in synchronism with a vertical synchronizing signal for the input video signal to be recorded.

In the following description, each video track is assumed to contain one field of the television video signal. It is apparent, however, that the scope of the instant invention is not limited to this particular case.

In the case where the video signal of one field is recorded on one video track, the rotation of the rotary head is controlled so that the vertical blanking portion of the television video signal is recorded at end portions of each video track (the margin of the tape). In a single-head helical VTR, wherein the television video signal is recorded by a single rotary head, the rotation of the single rotary head is controlled so as to rotate one revolution in one field period. In a dual-head helical VTR, wherein the television video signal is recorded by two rotary heads disposed apart from each other by 180°, the rotation of the rotary heads is controlled so as to rotate one-half revolution in one field period. Such control is accomplished by phase comparing a tachometer signal representing the rotating phase of the rotary head and a vertical synchronizing signal from the television video signal to be recorded. Accordingly, the vertical synchronizing signal for the television video signal to be recorded maintains a predetermined phase relationship with the tachometer signal in the record mode.

For reproducing the recorded video signal, the rotary head is controlled so as to rotate at a predetermined rotational speed in synchronism with a synchronizing signal being supplied from a reference sync generator or other reference signal. In normal reproduction, wherein the tape is transported at normal tape speed equal to the recording tape speed at which it was recorded, the running phase of the tape is controlled by controlling the rotation of the tape driving capstan so that the rotary head follows the center of a video track (achieves "tracking"), i.e., the head scanning path on the tape coincides with the video track.

The television video signal reproduced from the VTR contains a time-base fluctuation due to mechanical fluctuation in the rotation of the rotary head and the tape transport speed. Such time-base fluctuation can be corrected by a digital TBC. In a conventional digital TBC, as described in U.S. Pat. No. 3,909,839 entitled "PHASE LOCKING SYSTEM FOR TELEVISION SIGNALS USING DIGITAL MEMORY TECHNIQUES" issued to Inaba et al. and assigned to the present assignee, and in copending U.S. patent application Ser. No. 941,936 entitled "DIGITAL TIME-BASE CORRECTOR" by Mr. Mizukami, now U.S. Pat. No. 4,214,262, assignor to the present assignee, and one of the present joint inventors, a VTR-reproduced signal containing a time-base fluctuation is converted to a digital television video signal. The conversion is in response to a write-in clock pulse synchronized with a sync signal contained in the reproduced signal and the digital signal is stored in a digital memory. The stored digital television video signal is read out in response to a read-out clock pulse synchronized with a reference sync signal having no time-base fluctuation, and is converted to an analog television video signal. Thus, a television video signal containing a time-base fluctuation is stored in response to a write-in clock pulse containing the fluctuation and is read out in response to a read-out clock pulse containing no fluctuation, with the result being that no time-base fluctuation is contained in the read-out television video signal.

Because the helical-scan VTR records the television video signal of one field on a single video track, the television signals recorded on two adjacent video tracks have a very high correlation. Therefore, as described in the U.S. Pat. No. Re.27,371, now abandoned, entitled "RECORDING SYSTEM WITH PROVISION FOR FAST OR SLOW REPRODUCTION" issued to S. Okamura, the helical-scan VTR can produce a special-motion television video signal having a motion proportional to the reproducing tape speed when the tape is transported at a reproducing tape speed different from the normal tape speed and when the rotation of the rotary head is maintained at the recording rotational speed. In other words, special-motion reproduced television video signals, such as fast-, slow- and still-motion television video signals, can be produced when the tape is driven at a higher than normal reproducing tape speed, at a lower than the normal reproducing tape speed, or is stopped, respectively. In such special reproductions, the rotary head scans more than one video in one scanning period. This is in contrast to the rotary head scan following the center of the video track in normal reproduction.

The signal pattern on a tape recorded with a helical scan VTR is normally formed so that the corresponding horizontal synchronizing signals on two adjacent video tracks have a certain spacing provided between them. Therefore, when a rotary head scans across more than one video track, in the period of one field, the number of horizontal scanning lines reproduced in the period of one field will change by a degree proportional to the spacing between adjacent video tracks, and the number of video tracks across which the head is scanning. A change in the number of horizontal scanning lines in the period of one field means a change in the horizontal scanning period, or, in other words, a time-base change is contained in the reproduced television video signal. Consequently, the television video signal reproduced in a special reproduction mode contains a time-base error which comprises both a time-base fluctuation, inherent in the VTR reproduced signal, and a time-base change due to the special reproduction mode. The amount of the time-base change increases with the increase in the tape transport speed.

Copending U.S. patent application Ser. No. 91,195, entitled "VIDEO HEAD DEFLECTION APPARATUS FOR SPECIAL MOTION REPRODUCTION BY HELICAL SCAN VTR" by Y. Sato and T. Konishi, assignors to the present assignee, of whom T. Konishi is one of the present joint inventors, proposes an improved special reproduction system wherein the rotary head is deflected in a direction vertical to the video track so that the head will follow a single video track during a single scanning even when the tape is transported at a speed different from normal speed. In this improved special reproduction system, before the rotary head completes a single scanning of a single video track, it is displaced to the position of another video track, thus causing a change in the number of horizontal scanning lines being reproduced. Consequently, even the television video signal reproduced by such an improved reproduction system contains not only a time-base fluctuation inherent in the VTR reproduced signal but also a time-base change due to the special reproduction mode.

In the conventional TBC, a color burst signal is extracted from the horizontal sync signal for a reproduced television video signal, and the extracted color burst signal is applied to a burst controlled oscillator (BCO), whereupon a write-in clock pulse in synchronism with the reproduced television signal is generated. Therefore, when a television video signal, reproduced in the special reproduction mode contains a time-base change, i.e., there is a great change in the horizontal synchronizing frequency, it is very difficult for the conventional TBC to extract a color burst signal.

When a color burst signal can be extracted from a reproduced television video signal, containing a time-base change as well as time-base fluctuation, and a write-in clock pulse in synchronism with the reproduced television video signal can be produced in response to the extracted color burst signal, the conventional TBC can correct the time-base fluctuation but it cannot correct the time-base change, i.e., a change in the number of horizontal scanning lines.

Therefore, one object of the instant invention is to provide a digital TBC having a color burst separator circuit capable of extracting a color burst signal from a television video signal that has undergone a change in the horizontal synchronizing frequency.

It is another object of the instant invention to provide a digital TBC for correcting a television video signal, that has undergone a change in the number of horizontal scanning lines, to a television video signal having the normal number of horizontal scanning lines.

It is a further object of the instant invention to provide a digital TBC for correcting a time-base error in a television video signal which includes not only time-base fluctuation but also time-base change.

SUMMARY OF THE INVENTION

The digital TBC, according to a first aspect of the instant invention, comprises an improved color burst signal separator circuit, in which information on the leading edge of a horizontal sync signal, separated from an input television video signal, is delayed by variable delay means, and a gate pulse of a given width is generated on the basis of said delayed information. Using this gate pulse, information on the trailing edge of the horizontal sync signal is separated, and on the basis of such information, a burst gate pulse of a given width is generated. The input television video signal is gated with the burst gate pulse to extract a color burst signal. The delay time of said variable delay means is controlled by the phase difference between the information at the trailing edge and the delayed information at the leading edge of the horizontal sync signal.

Since the improved color burst signal separator circuit, controls the delay time of the variable delay means in response to a change in the horizontal scanning period, or a change in the pulse width of the horizontal sync signal, it is capable of extracting, under any condition, the trailing edge of the horizontal sync signal and generating a burst gate pulse. Hence, the improved color burst signal separator circuit is capable of extracting a color burst signal in spite of a change in the horizontal synchronizing frequency.

The digital TBC, according to another aspect of the instant invention, comprises an improved write-in address pulse generator circuit wherein the burst gate pulse separated from the input television video signal is phase-compared with an output signal from a voltage-controlled oscillator (VCO) to provide a first phase error signal. The burst gate pulse is also supplied to a 1H delay means, and a phase comparison is achieved between the input and output signals of the 1H delay means to obtain a second phase error signal. The second phase error signal is mixed with the first phase error signal, and the result is supplied to said VCO as a control signal. The output pulses from the VCO are supplied to a pulse generator which is supplied with a vertical sync signal as a reset pulse. The pulse generator generates a write-in vertical reference-address pulse when it is reset by the vertical sync signal or when the pulse count reaches a predetermined state.

In the improved write-in address pulse generator, the second phase error signal represents a change in the frequency of the horizontal sync signal. Therefore by supplying the VCO with not only the second phase error signal as well as the first phase error signal, a wide range of the pull-in frequency for VCO can be obtained. Since a write-in vertical reference-address pulse is generated upon supply of a vertical sync signal to the counter or upon counting a specified number of horizontal sync signals, a television video signal having the normal number of horizontal scanning lines can be read out regardless of a change in its number.

The above and other objects and advantage of this invention will be apparent from the following description of a preferred embodiment of the invention taken in conjunction with the accompanying drawings.

DETAILED DESCRIPTION

Figure 1:
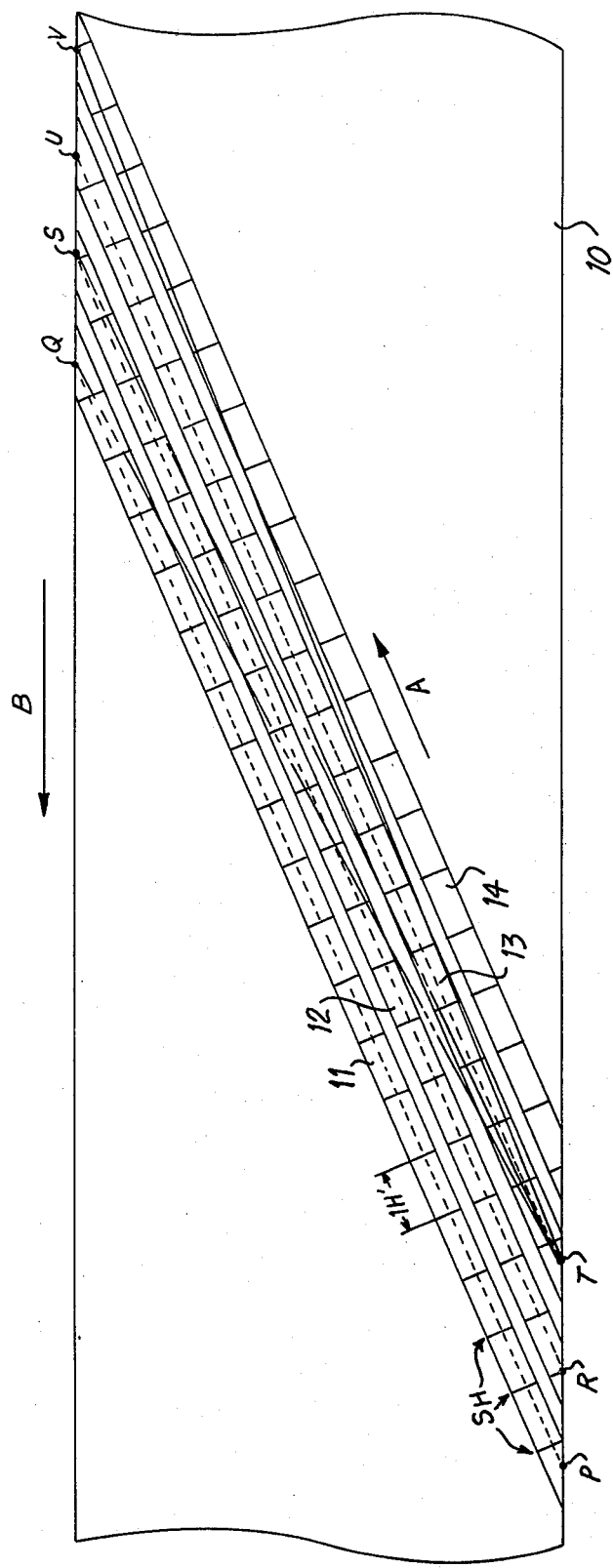
FIG. 1 is a video track format of a tape on which a television video signal is recorded by a helical-scan VTR.

Referring to FIG. 1, a magnetic tape 10 on which television video signals have been recorded by a helican-scan VTR has a plurality of video tracks 11, 12, 13, 14 each containing video information from one field. The tracks are formed diagonally with respect to the longitudinal direction of the tape and the tape is transported in the direction of arrow B by a rotary head (not shown) rotating in the direction of arrow A. The actual magnetic tape has other tracks (such as an audio track, control track and cue track) formed parallel to the lengthwise direction of the tape, but these tracks are omitted for purposes of simplicity.

When the magnetic tape 10 is transported for playback at a speed, equal to normal transport speed as attained in the record mode, the rotary head achieves perfect tracking of the video track. The center of the rotary head starts scanning at a point P on the video track 11, scans the track while depicting the path indicated by the dashed line PQ and ends the scanning at a point Q on the same video track 11. Since magnetic tape 10 moves one pitch of video track, in one scanning period, the rotary head passes the point Q almost concurrently with the next rotary head, (for a dual-VTR) or the same head (for a single VTR), passing a point R on the adjacent video track 12. In the next scanning period the rotary head scans the video track 12 from point R to point S depicting the path shown by the dashed line RS. In the subsequent scanning period, the rotary head scans video track 13 from point T to point U. Thus, the rotary head achieves perfect tracking of the video tracks during normal tape transport.

Let us now assume that the tape is stopped and rotation of the rotary head is maintained at a predetermined rate, i.e., at the vertical scanning rate. The rotary head, positioned at point T on video track 13, will scan toward point S on video track 12, ahead of track 13, while depicting the path shown by the long and short dashed line TS. Since magnetic tape 10 is stopped, the rotary head repeatedly scans the same portion of the tape while depicting the path indicated by the long and short dashed line TS. Therefore, the rotary head that has started scanning the center of track 13, at point T, gradually loses alignment with that track and shifts toward the adjacent track 12 until it scans the center of said adjacent track at point S.

When tape 10 is reversed at a speed equal to normal tape speed, point Q moves to point S (FIG. 1) during a single scanning by the rotary head, and therefore, the head scans from point T to point Q.

When tape 10 is run in the forward direction (indicated by arrow A) twice as fast as normal tape speed, the magnetic tape moves by two pitches of video track during a single scanning by the rotary head, in other words, point V on the video track 14 of FIG. 1 moves to point S. Therefore, the rotary head scans from point T to point V.

The rotary head will scan across more video tracks when tape 10 runs at an even faster speed in the forward or reverse directions.

Even when tape 10 is transported for playback at a reproducing tape speed different from the normal speed, the television video signal, having a motion proportional to the reproducing tape speed, can be reproduced by scanning the video tracks wherein, as shown in FIG. 1, the phases of the horizontal sync signals $S_H$ on the video tracks are aligned with other.

In the tape stop mode the rotary heads scan the tape from point T to point S, while scanning from point T to point U in the normal reproduction mode. Therefore, the scanning length during one scanning in the tape stop mode is shorter than that in the normal mode by the difference between the horizontal scanning periods of adjacent video tracks (1.5 H in FIG. 1). When tape 10 is transported in the reverse direction at the normal tape speed, the rotary head scans from point T to point Q across three video tracks, whereby the scanning length is shorter than that in normal reproduction by 3 H. Conversely, when the rotary head scans the tape from point T to point V, with the tape running twice as fast as normal speed, the scanning length is longer by 1.5 H than that in the normal reproduction mode.

In FIG. 1, the width and angle of the video tracks are shown on an exaggerated scale for simplicity. Nevertheless, since the actual tape recorded by a VTR is designed so that adjacent video tracks are spaced from each other by 2.5 H, the scanning length in the special reproduction mode, in a single scanning period, will differ from that in the normal reproduction mode by a degree greater than the values given above. However, since the rotary head keeps revolving at a constant speed, the four periods of scanning, i.e., from point T to point U (in normal mode), from point T to point S (in stop mode), from point T to point Q (in reverse mode), and from point T to point V (in twice speed mode), are equal. Therefore, such change in scanning length causes a change in the number of horizontal synchronizing lines, or the number of horizontal synchronizing periods as reproduced in a single scanning (in the period of one field). Such change in the number of horizontal scanning lines, in a one-field period, means that the reproduced television video signal contains not only a time-base fluctuation but also a time-base change as well.

Figure 2:
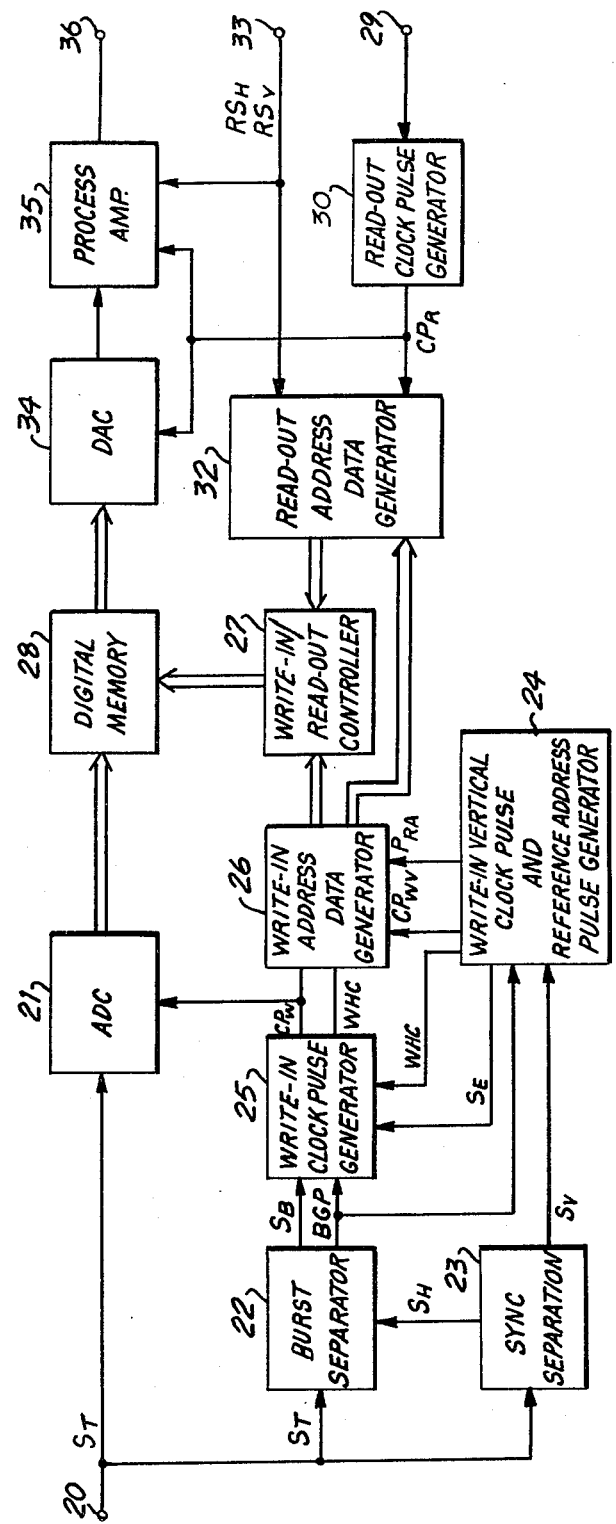
FIG. 2 is a block diagram of one embodiment of this invention.

Referring to FIG. 2, an input terminal 20 is supplied with a television video signal $S_T$ reproduced in the special reproduction mode by a helical scan VTR. From terminal 20, the television video signal $S_T$ is supplied to an analog/digital converter (ADC) 21, a burst separator 22 and a sync separator 23. The burst separator 22 is also supplied with a horizontal sync signal $S_H$ separated at the sync separator 23. As will be described later by reference to FIG. 3, the burst separator 22 generates a color burst signal $S_B$ and a burst gate pulse BGP from the input television video signal $S_T$ using the horizontal sync signal $S_H$ as a reference.

The burst gate pulse BGP and vertical sync signal $S_V$ are supplied to a write-in vertical clock and reference-address pulse generator 24. As will be described later by reference to FIG. 5, the pulse generator 24 generates a write-in vertical clock pulse $CP_{WV}$, write-in line control signal WLC and write-in vertical reference-address pulse $P_{RA}$.

The write-in line control signal WLC is supplied to a write-in clock pulse generator 25 which is also supplied with the color burst signal $S_B$ and the burst gate pulse BGP from the burst separator 22. As will be described later by reference to FIG. 6, the write-in clock pulse generator 25 generates, in synchronism with the color burst signal $S_B$, a write-in clock pulse $CP_W$ having a frequency of 14.32 MHZ (3.58 MHz×4). The write-in clock pulse $CP_W$ is supplied to the ADC 21, which converts the input television video signal $S_T$ to, for example, an 8-bit time-parallel PCM video signal.

The write-in clock pulse $CP_w$ is supplied to a write-in address data generator 26 which is also supplied with the write-in vertical clock pulse $CP_{wv}$ from the pulse generator 24. The write-in address address data generator 26 generates a write-in address data $WA_D$ which is supplied to a digital memory 28 through a write-in/read-out controller 27. The digital memory 28 is also supplied with the PCM video signal from the ADC 21, and the PCM video signal is stored at an address designated by the write-in address data $WA_D$. The digital memory has a capacity capable of storing a digital video signal having a 16 line period (16H).

A read-out sub-carrier $RS_B$ is supplied from a terminal 29 to a read-out clock pulse generator 30, which generates a read-out clock pulse $CP_R$ having a frequency of 14.32 MHz. The read-out clock pulse $CP_R$ is supplied to a read-out address data generator 32 which is also supplied with a read-out horizontal sync signal $RS_H$ and vertical sync signal $RS_V$ from a terminal 33. The read-out address data generator 32 supplies read-out address data RAD to the digital memory 28 through the write-in/read-out controller 27. Depending upon the read-out address data RAD, a PCM video signal is read out from the digital memory 28 and supplied to a digital/analog converter (DAC) 34. The DAC 34, which is supplied with the read-out clock pulse $CP_R$ from the read-out clock pulse generator 30, converts the PCM video signal to an analog video signal. The analog video signal is processed in a process amplifier 35 which is supplied with the read-out horizontal sync signal $RS_H$, read-out vertical sync signal $RS_V$, and read-out clockpulse $CP_R$, and then delivered from an output terminal 36.

Figure 3:
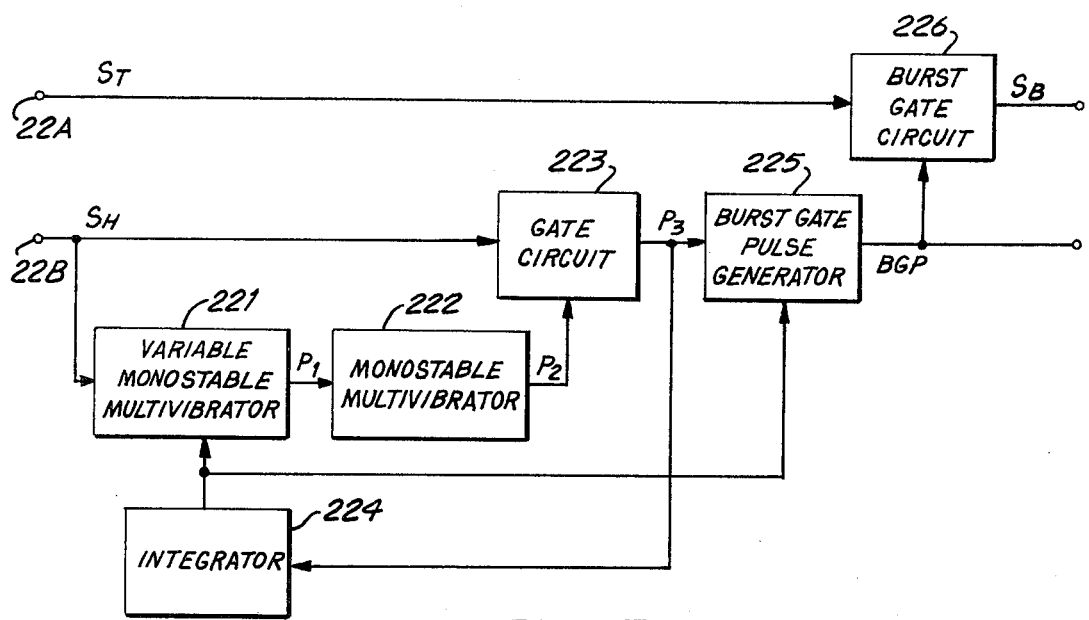
FIG. 3 is a block diagram of a burst separator used in the embodiment shown in FIG. 2.
Figure 4A:
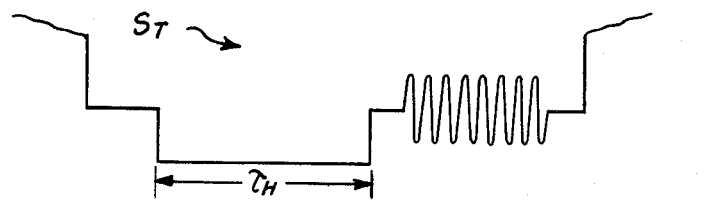
FIGS. 4A to 4G show waveform diagrams of signals appearing at various portions of the burst separator shown in FIG. 3.
Figure 4B:
Figure 4C:
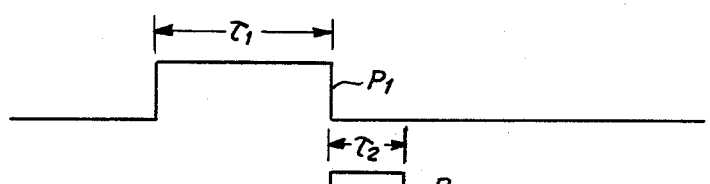
Figure 4D:
Figure 4E:
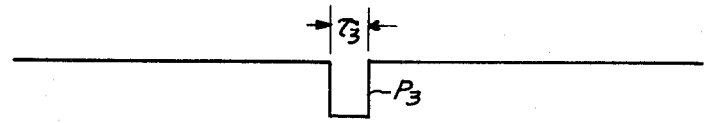

Referring to FIG. 3, the burst separator 22 (FIG. 2) is supplied at terminals 22A and 22B with the input television video signal $S_T$ and the horizontal sync signal $S_H$, as shown in FIGS. 4A and 4B, respectively. The horizontal sync signal $S_H$ (whose width $\tau_H$ is 4.7 μs in the normal state) is supplied to a variable monostable multivibrator 221. The monostable multivibrator 221 generates a pulse $P_1$ which, as shown in FIG. 4C, rises at the leading edge of the horizontal sync signal $S_H$ and whose pulse width $\tau_l$ varies with the control voltage supplied to a control terminal. The pulse width $\tau_1$, in the normal state, is selected to be 4.2 μs. The pulse $P_1$ is supplied to a monostable multivibrator 222 which generates a gate pulse $P_2$ that, as shown in FIG. 4D, rises at the trailing edge of the pulse $P_1$ and which has a pulse width $\tau_2$ (e.g. 1 μs). The gate pulse $P_2$ is supplied to a gate circuit 223 which is also supplied with the horizontal sync signal $S_H$. The gate circuit 223 generates a pulse $P_3$ which, as shown in FIG. 4E, has a pulse width $\tau_3$ equal to the period during which both the horizontal sync signal $S_H$ and gate pulse $P_2$ are present. Therefore, the trailing edge of the pulse $P_3$ agrees with the trailing edge of the horizontal sync signal $S_H$ and its pulse width $\tau_3$ varies with the pulse width $\tau_H$. The pulse $P_3$ is supplied to an integrator 224 which generates a control signal having a voltage proportional to the pulse width $\tau_3$. The control signal is supplied to the control terminal of the variable monostable multivibrator 221 and controls the pulse width $\tau_1$ of the pulse $P_1$.

When the pulse width $\tau_H$ of horizontal sync signal $S_H$ increases, the pulse width $\tau_3$ of pulse $P_3$ increases, with the result that the pulse width $\tau_1$ of pulse $P_1$ also increases. Conversely, when the pulse width $\tau_H$ decreases, the pulse width $\tau_3$ decreases, with the result that the pulse width $\tau_1$ also decreases. Hence, even if there is a change in the horizontal scanning period, i.e. the pulse width $\tau_H$ of the horizontal sync signal $S_H$ in the special reproduction mode, it is possible to extract the trailing edge of the horizontal sync signal $S_H$.

Figure 4F:
Figure 4G:
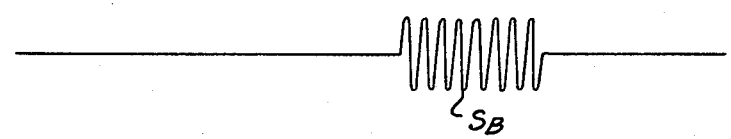
Figure 6:
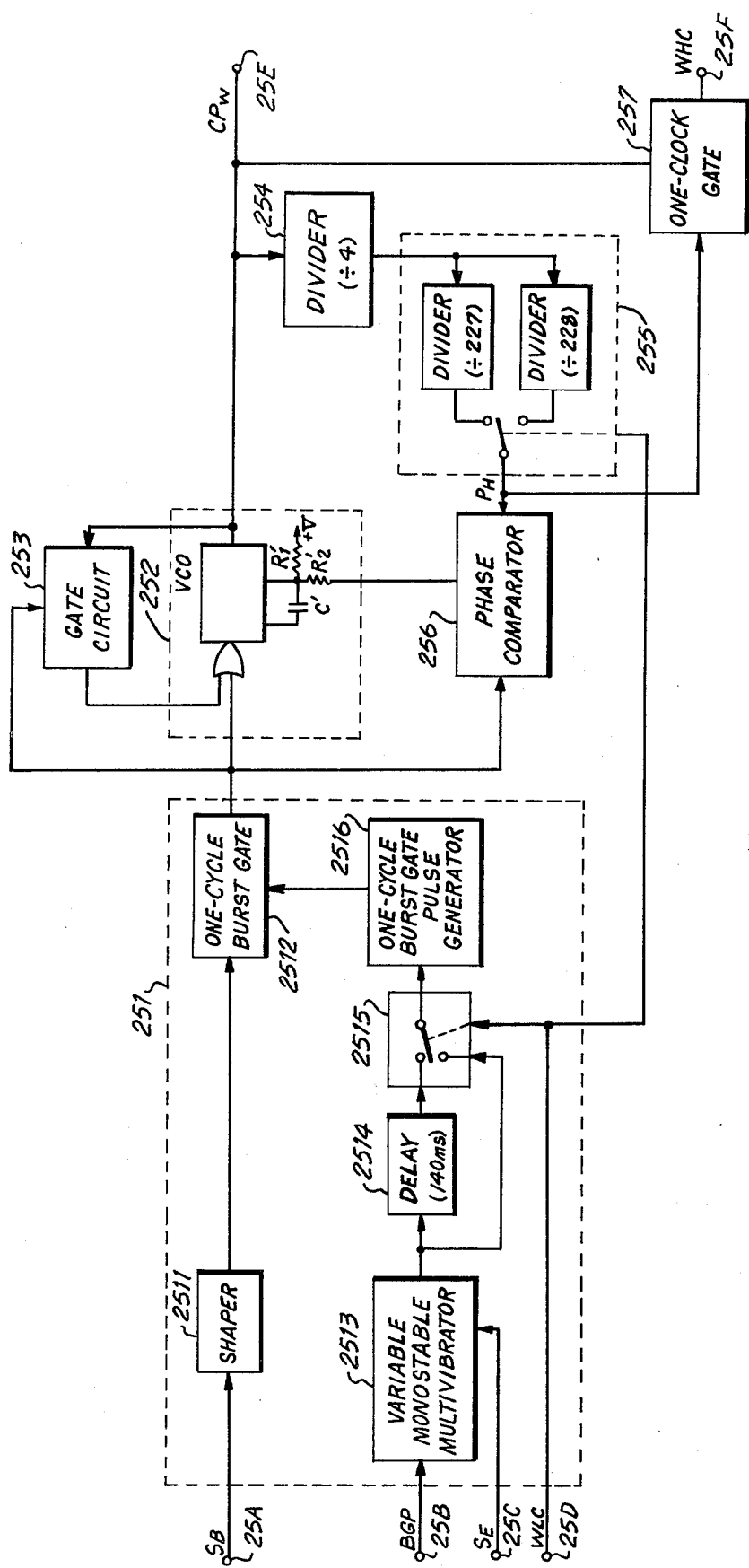
FIG. 6 is a block diagram of a write-in clock pulse generator used in the embodiment shown in FIG. 2.

The pulse $P_3$ from gate circuit 223 is supplied to a burst gate pulse generator 225 which is supplied with the control signal from the integrator 224 and generates a burst gate pulse BGP. The burst gate pulse BGP, as shown in FIG. 4F, rises at the trailing edge of pulse $P_3$ or the extracted trailing edge of the horizontal sync signal $S_H$ and has a pulse width $\tau_4$ which is controlled by the control signal. The burst gate pulse BGP is supplied to a burst gate circuit 226 which is also supplied with the television video signal $S_T$. The burst gate circuit 226 separates and extracts a color burst signal $S_B$ as shown in FIG. 4G, and delivers the same at a terminal 22C. The extracted color burst signal $S_B$ is supplied to the write-in clock pulse generator 25 (FIGS. 2 and 6).

The burst separator 22 has a feedback loop wherein the pulse width $\tau_1$ of pulse $P_1$, referenced to the leading edge of the horizontal sync signal $S_H$, is controlled by the pulse width $\tau_H$ of the horizontal sync signal $S_H$. It is, therefore, possible to usually extract the information contained in the trailing edge of the horizontal sync signal $S_H$ even if there is a change in its pulse width $\tau_H$, or a change in the number of horizontal scanning lines in a one-field period of reproduced television video signal. This makes it possible to extract the color burst signal $S_B$ even in the special reproduction mode.

It is apparent that the burst separator 22 shown in FIG. 3 may be modified so that the pulse width $\tau_2$ of the gate pulse $P_2$ is controlled by the control signal from the integrator 224. With this modification, in integrator 224, a positive going pulse is produced by AND-gating the horizontal sync pulse $S_H$ and the gate pulse $P_2$ and the control signal is produced by adding the integrated values of the positive going pulse and the negative going pulse $P_3$, to thereby produce a control signal of zero voltage in the normal reproduction mode.

Figure 5:
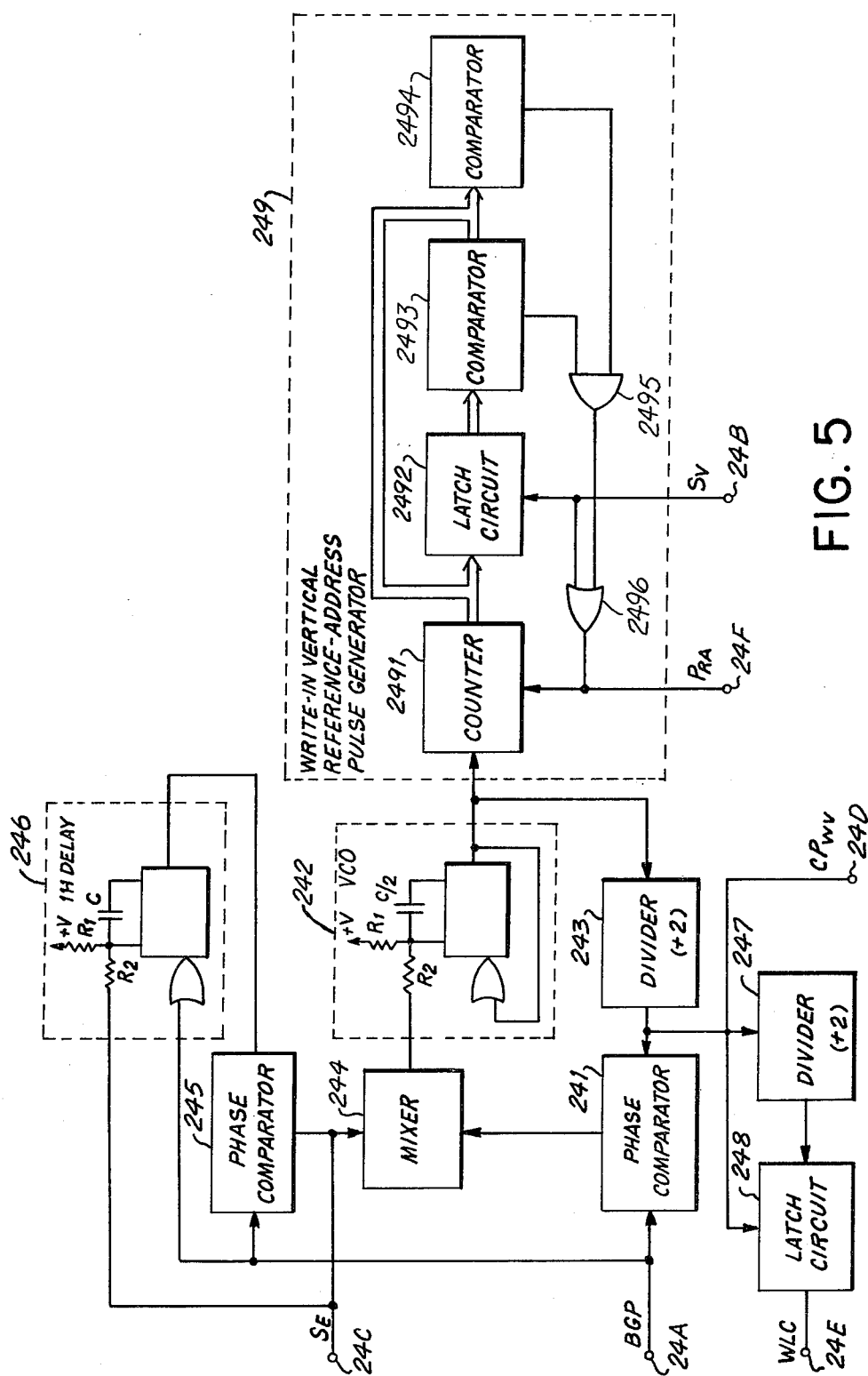
FIG. 5 is a block diagram of a write-in vertical clock and reference-address pulse generator used in the embodiment shown in FIG. 2.

By reference to FIG. 5, the write-in address clock pulse generator 24 is supplied at terminals 24A and 24B with the burst gate pulse BGP and vertical sync signal $S_v$, respectively. The burst gate pulse BGP is supplied to a first phase comparator 241 which is also supplied with an output signal from a voltage-controlled oscillator (VCO) 242 oscillating at a frequency twice the horizontal scanning frequency $f_H$ after said signal has its frequency reduced to $f_H$ in a frequency divider 243. The first phase comparator 241 phase-compares the two signals and generates a first phase error signal that represents the phase difference of the two signals. The first phase error signal is supplied to VCO 242 through a mixer 244 and controls the oscillating frequency of the VCO. By this arrangement, VCO 242 delivers an output signal phase-locked to the burst gate pulse BGP and with a frequency twice the horizontal scanning frequency.

The burst gate pulse BGP is also supplied to a second phase comparator 245 and a 1H delay circuit 246. The 1H delay circuit 246 delays the burst gate pulse BGP by 1H and produces a delayed signal $BGP_D$. The delayed signal $BGP_D$ is supplied to the second phase comparator 245 where it is phase-compared with undelayed signal BGP to generate a second phase error signal $S_E$ representing the phase difference between the two signals. The second phase error signal $S_E$ is supplied to the 1H delay circuit 246 as a delay-time control signal, whereby the delay time is controlled in response to the change in the horizontal scanning frequency $f_H$, i.e., the change in the horizontal scanning period H. In other words, the delay time follows the change in the horizontal scanning period H.

The second phase error signal $S_E$ is also supplied to the mixer 244 and mixed with the first phase error signal to produce a control signal which is supplied to VCO 242. The second phase error signal represents a change in the frequency of the burst gate pulse BGP, i.e., the horizontal scanning frequency $f_H$. Therefore, the supply of the second phase error signal, as part of the control signal to VCO 242, causes the locking range of VCO 242 to expand and to accommodate a greater change in the horizontal scanning frequency $f_H$. The second phase error signal $S_E$ is further supplied through a terminal 24C to the write-in clock pulse generator 25 (FIG. 6).

As understood from FIG. 5, VCO 242 and 1H delay circuit 246 have a similar circuit configuration in order to provide a locking range having very stable temperature characteristics and which is great enough to accommodate a large change in the frequency of the horizontal sync signal. More specifically, both VCO 242 and 1H delay circuit 246 use a monostable multivibrator; the VCO 242 forms an oscillator by feeding back an output signal as a trigger input, whereas the 1H delay circuit 246 is supplied with the burst gate pulse BGP as a trigger input. The VCO 242 and 1H delay circuit 246 may comprise of Dual Monostable Multivibrator Monolithic Integrated Circuit 96S02 marketed by Fairchild Camera and Instrument Corporation, in which two monostable multivibrators are formed on a single chip. The monostable multivibrators on the single chip of the IC 96S02 are connected to time-constant circuits comprised of resistors $R_1$ and $R_2$ and a capacitor C (and C/2) and having time constants so determined that the oscillation cycle and delay time are $\frac{1}{2}$H and 1H, respectively. The resistors $R_2$ are supplied with the mixed phase error signal from the mixer 244 and the second phase error signal $S_E$ to thereby control the oscillation cycle and the delay time, respectively.

The output signal from divider 243, having a frequency $f_H$, (pulse width of $\frac{1}{2}$H) is supplied not only through a terminal 24D to the write-in address data generator 26 (FIG. 7) as a vertical clock pulse $CP_{WV}$ but also to a divider 247 and a latch circuit 248. The output signal from divider 243 is frequency-divided in the divider 247 to produce a signal of frequency $\frac{1}{2}f_H$ (pulse width of 1H), which is then supplied to the latch circuit 248 and latched by the trailing edge of the output signal of the divider 243, whereby the latch circuit 248 produces a write line control signal WLC having a frequency of $\frac{1}{2}f_J$, and a pulse width of 1H. The write line control signal WLC is supplied from a terminal 24E to the write-in clock pulse generator 25 (FIG. 6).

The VCO output signal, having a frequency $f_H$, is also supplied to a write-in vertical reference-address pulse generator 249, which is supplied with the vertical sync signal $S_v$ from terminal 24B. The vertical reference-address pulse generator 249 comprises a 10-bit binary counter 2491. The output of counter 2491 is connected to a latch circuit 2492 and a comparator 2493. The latch circuit 2492 latches the contents of counter 2491 when vertical sync signal $S_v$ is applied thereto. The latched data is supplied to comparator 2493, which generates a coincidence pulse when the contents of counter 2491 is coincident with the latch data. The contents of counter 2491 are also supplied to a comparator 2494, which generates, only when the count is greater than a preset value e.g., 256, a gate pulse. The gate pulse is applied to an AND gate 2495 causing the coincidence pulse from the comparator 2493 to pass therethrough. The coincidence pulse is applied to an OR gate 2496, which is also supplied with the vertical sync signal $S_v$. The output pulse from the OR gate 2496 is supplied to the counter 2491 as the reset the counter pulse to reset to zero.

In the normal reproduction mode, because the number of the VCO output signal of frequency $2f_H$ is 525, the latch circuit 2492 holds data equal to '525'. The coincidence pulse is obtained every time the contents of counter 2491 becomes '525' i.e., at every occurrence of the vertical sync signal $S_v$. Thus, a reset pulse is obtained from OR gate 2496 once a field period and counter 2491 is reset (self-cleared). Therefore, the reset pulse can be obtained even if the vertical sync signal $S_v$ is dropped out.

In the case where the number of the horizontal sync signal $S_H$ i.e., the horizontal scanning lines within one field period increases to $(525+\alpha)/2$, the contents of counter 2491 reaches the latched data (525) before the application of the vertical sync signal $S_v$ to produce the coincidence pulse, which is applied as a reset pulse to counter 2491. After resetting, the vertical sync signal $S_v$ is applied to counter 2491 and latch circuit 2492, whereby a small number accumulated ($\alpha$) in counter 2491 is latched by the latch circuit 2492, counter 2491 is reset, and the coincidence pulse is generated from comparator 2493. However, this coincidence pulse is not passed through AND gate 2495 because no gate pulse is produced from comparator 2494. Therefore, when the contents of counter 2491 accumulates the small number (a), comparator 2493 generates the coincidence pulse which is not passed through AND gate 2495 because no gate pulse is generated by comparator 2494, whereby counter 2491 is not reset but continues to count. When the following vertical sync signal Sv is applied to counter 2491 and latch circuit 2492, latch circuit 2492 holds the increased data (525+$\alpha$), and comparator 2493 generates the coincidence pulse to reset the contents of counter 2491 to zero. After this, the reset pulse is obtained from OR gate 2496 even when the vertical sync signal $S_v$ is dropped out, because the coincidence pulse is generated by comparator 2493 every time the contents of counter 2491 reaches the latched data (525+$\alpha$).

Conversely, in the case where the horizontal scanning line number decreases to $(525-\beta)/2$, before the contents of counter 2491 reaches to '525', i.e., when the content is (525-$\beta$), the vertical sync signal $S_v$ is applied to counter 2491 and latch circuit 2492, whereby contents of counter 2491 (525-$\beta$) is latched in latch circuit 2492, and the coincidence pulse is generated by comparator 2493 and supplied through AND gate 2495 and OR gate 2496 to counter 2491 to reset the counter to zero. The reset pulse is obtained from OR gate 2496 every time the vertical sync signal Sv is applied i.e., the contents of counter 2491 reaches the latched data (525-$\beta$). Therefore, the reset pulse can be obtained even if the vertical sync signal $S_v$ is dropped out.

The reset pulse from OR gate 2496 (i.e., the vertical sync signal $S_v$ and the coincidence pulse from AND GATE 2495) is supplied through a terminal 24F to the write-in address data generator 26 (FIG. 7) as the write-in vertical reference-address pulse $P_{RA}$. Thus, the write-in vertical reference-address pulse generator 249 stores the number of horizontal scanning lines for the preceding field period and compares it with that for the following field period to produce the write-in vertical reference-address pulse $P_{RA}$.

Referring to FIG. 6, the write-in clock pulse generator 25 comprises a trigger pulse generator 251 which is supplied at its terminals 25A, 25B, 25C and 25D with the color burst signal $S_B$, and the burst gate pulse BGP from the burst separator 25 (FIG. 3), the phase error signal $S_E$ and the write-in line control signal WLC from the pulse generator 24 (FIG. 5), respectively. The color burst signal $S_B$ is supplied to a pulse shaper 2511 to produce a burst pulse $P_B$, which is then supplied to a one-cycle-burst gate circuit 2512.

The burst gate pulse BGP is supplied to a variable monostable multivibrator 2513, which is also supplied with the phase error signal $S_E$ as the pulse-width control signal. The output signal is directly supplied to a switch circuit 2515 and also supplied to switch circuit 2515 through a delay circuit 2514 whose delay time is 140 ns (a half of one subcarrier cycle). The switching operation of switch circuit 2514 is controlled by the write-in line control signal WLC. The pulse from switching circuit 2515 is supplied to a one-cycle burst gate pulse generator 2516 to produce a one-cycle burst gate pulse, which is then supplied to the one-cycle burst gate circuit 2512, whereby, a burst pulse of one cycle is extracted as a trigger pulse $P_T$ from burst gate $P_B$ once a field period.

The trigger pulse $P_T$ is supplied to a voltage-controlled oscillator (VCO) 252 as a trigger input. The VCO 252 may be comprised of a monolithic IC 96S02 and is identical to VCO 242 (FIG. 5) except that the resepctive components of the time constant circuit ($R'_1$, $R'_2$ and $C'_1$) are selected so that the central oscillation frequency is 14.32 MHz. The output of VCO 252 is fed back to its trigger input through gate circuit 253 to thereby provide an oscillator. Gate circuit 253 is supplied with trigger pulse $P_T$ as a gate pulse and stops the feedback of the VCO output to the trigger input at the time of application of trigger pulse $P_T$. The output from VCO 252 is supplied to a ¼ frequency divider 254 to produce a subcarrier pulse of subcarrier frequency (3.58 MHz), which is supplied to H-rate pulse generator 255. The generator 255 comprises a divide-by-227 circuit and a divide-by-228 circuit for producing a pulse every time the subcarrier pulses of 227 and 228 are applied thereto, respectively. Generator 255 also includes a switch circuit whose switching operation is controlled by the write-in control signal WLC, to thereby produce a H-rate pulse $P_H$ having a repetition period which is alternately equal to 227 and 228 subcarrier cycles. The H-rate pulse $P_H$ is supplied to a phase comparator 256 and phase-compared with the trigger pulse $P_T$ to produce a phase error signal, which is supplied to VCO 252 as the control signal, whereby the VCO generates the write-in clock pulse $CP_W$ having a frequency of 14.32 MHz and being synchronized with the color burst $S_B$. The write-in clock pulse $CP_W$ is supplied from terminal 25E to the write-in address data generator 26.

The H-rate pulse $P_H$ is also supplied to a one-clock gate circuit 257, which is supplied with the write-in clock pulse $CP_W$ and generates a horizontal clear pulse WHC. The horizontal clear pulse WHC is supplied from a terminal 25F to the write-in address data generator 26.

The write-in clock pulse generator 25 is substantially identical to that described in the above-mentioned copending application Ser. No. 941,936 in basic circuit configuration except that the burst gate pulse BGP (the horizontal sync signal in the copending case) is variably delayed in response to the phase error signal $S_E$.

Figure 7:
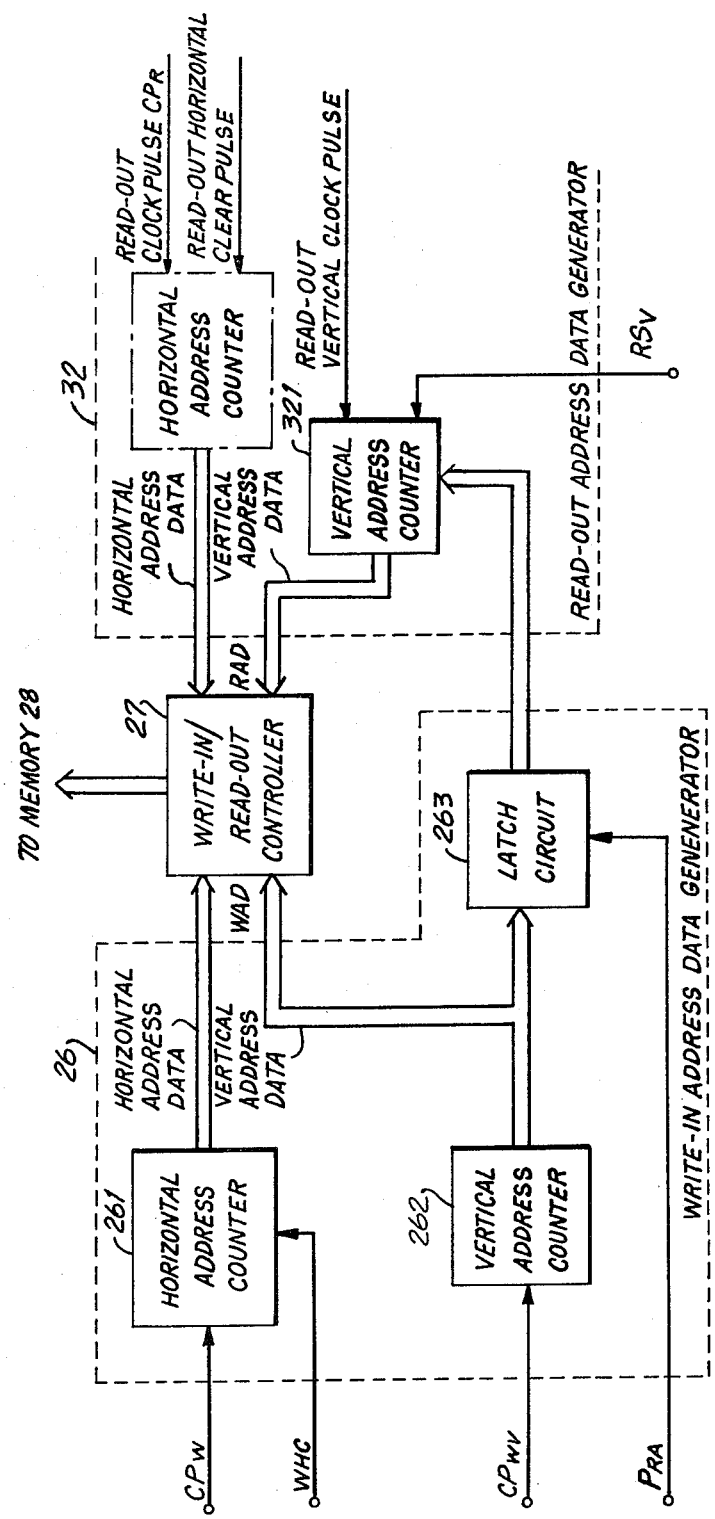
FIG. 7 is a block diagram of a write-in address data generator used in the embodiment shown in FIG. 2.

Referring to FIG. 7, the write-in address data generator 26 comprises horizontal address counter 261 for generating a horizontal address data upon receipt of the write-in clock pulse $CP_W$ and the write-in horizontal clear pulse WHC, and a write-in vertical address counter 262 comprised of a 4-bit binary counter for counting the write-in vertical clock pulse $CP_{WV}$ to produce 4-bit write-in vertical address data. The write-in vertical and horizontal address data are supplied through controller 27 to memory 28.

The write-in vertical address is also supplied to a latch circuit 263, which is supplied with the write-in vertical reference-address pulse $P_{RA}$. The latch circuit 263 holds the write-in vertical address data when the vertical reference-address pulse $P_{RA}$ is applied thereto. The latched data is supplied to the read-out vertical address counter 321 in the read-out address data generator 32. When the read-out vertical sync signal $RS_V$ is applied to the read-out vertical address counter 321, the content of the counter 321 is reset to the latched data supplied from latch circuit 263. This makes it possible to coincide the read-out vertical address with the write-in vertical address.

Although a specific embodiment of this invention has been shown and described, it will be understood that various modifications may be made without departing from the spirit of this invention.

What is claimed is:

1. A time-base corrector for correcting the time-base error contained in a television video signal comprising:
    (a) means for generating a first clock pulse in synchronism with said television video signal;
    (b) means responsive to said first clock pulse for converting said television video signal to a digital video signal;
    (c) digital memory means for storing said digital video signal;
    (d) means responsive to said first clock pulse, a first horizontal sync signal and a first vertical sync signal contained in said television video signal for generating write-in address data designating an address at which said digital video signal is to be written into said digital memory;
    (e) means for generating a second clock pulse in synchronism with a reference signal;
    (f) means responsive to a second horizontal sync signal and a second vertical sync signal contained in said reference signal and said second clock pulse for generating read-out address data designating an address at which the stored digital video signal is read out from said digital memory; and
    (g) means responsive to said second clock pulse for converting the read-out digital video signal to an analog signal; wherein said first clock pulse generating means comprises:
        (i) delay means for delaying the leading edge of said first horizontal sync signal to generate a delayed leading edge signal;

(ii) means for generating a first gate pulse of a predetermined pulse width in response to said delayed leading edge signal;
(iii) means for gating said first horizontal sync signal with said first gate pulse to extract a trailing edge signal from said first horizontal sync signal;
(iv) means for controlling the delay time of said delay means in response to the time interval between said delayed leading edge signal and said trailing edge signal;
(v) means for generating a second gate pulse in response to said trailing edge signal; and
(vi) means for gating said television video signal with said second gate pulse to extract a color burst signal; said first color pulse being produced from said color burst signal.

2. A time-base corrector in accordance with claim 1, wherein the pulse width of said second gate pulse is controlled in response to said time interval between said delayed leading edge signal and said trailing edge signal.

3. A time-base corrector in accordance with claim 1, wherein said write-in address data generating means comprises, a voltage controlled oscillator, first means for comparing the phase difference between said second gate pulse and an output signal from said voltage controlled oscillator, means responsive to said first comparing means for generating a first phase error signal, means for delaying said second gate pulse by an interval of time equal to one horizontal scanning period of said television video signal to produce a delayed second gate pulse, second means for comparing the phase difference between said second gate pulse and said delayed second gate pulse, means responsive to said second comparing means for generating a second phase error signal, means for mixing said first phase error signal with said second phase error signal to produce an oscillator control signal and for applying said oscillator control signal to said voltage controlled oscillator.

4. A time-base corrector in accordance with claim 3, wherein said television video signal gating means includes delay means for delaying said second gate pulse in response to said second phase error signal.

5. A time-base corrector in accordance with claim 3, wherein said write-in address data generating means further comprises, means for counting an output signal from said voltage controlled oscillator, means responsive to said first vertical sync signal for storing the binary state of said counter, first means for comparing the binary state of said counter with the binary state of said storing means and for generating a first control signal when said counter binary state and said storing means binary state are coincident, second means for comparing the binary state and of said counter with a fixed binary state for generating a second control signal when said counter binary state exceeds said fixed binary state, and means responsive to the simultaneous presence of said first and second control signals for resetting said counting means.

6. A time-base corrector in accordance with claim 5, wherein said write-in address data generating means further comprises a write-in vertical address counter for generating write-in vertical address data and a latch circuit for storing said write-in vertical address data in response to at least one of said first vertical sync signal and the simultaneous presence of said first and second control signals, said read-out address data generating means further comprising a read-out vertical address counter for generating read-out vertical address data, said read-out vertical address counter being reset to the contents in said latch circuit in response to said second vertical sync signal.

7. A time-base corrector in accordance with claim 3, wherein said voltage controlled oscillator and said second gate pulse delaying means are composed of monostable multivibrators.

8. A time-base corrector in accordance with claim 7, wherein said voltage controlled oscillator and said second gate pulse delaying means are composed of monostable multivibrators.

9. A time-base corrector in accordance with claim 8, wherein said monostable multivibrators are formed on a single chip.

* * * * *